(12) United States Patent
Sato

(10) Patent No.: US 8,411,470 B2
(45) Date of Patent: Apr. 2, 2013

(54) SYNCHRONOUS RECTIFICATION CONTROL DEVICE, METHOD FOR SYNCHRONOUS RECTIFICATION CONTROL, AND INSULATED TYPE SWITCHING POWER SUPPLY

(75) Inventor: Tadahiko Sato, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 285 days.

(21) Appl. No.: 12/923,370

(22) Filed: Sep. 17, 2010

(65) Prior Publication Data

US 2011/0075464 A1 Mar. 31, 2011

(30) Foreign Application Priority Data

Sep. 28, 2009 (JP) ................................ 2009-222725

(51) Int. Cl.
*H02M 3/335* (2006.01)
(52) U.S. Cl. .................................................. 363/21.06
(58) Field of Classification Search ............... 363/21.04, 363/21.06, 21.14, 89, 127
See application file for complete search history.

(56) References Cited

U.S. PATENT DOCUMENTS

| | | | |
|---|---|---|---|
| 6,026,005 A | 2/2000 | Abdoulin | |
| 6,577,518 B2 | 6/2003 | Abdoulin | |
| 7,173,835 B1 * | 2/2007 | Yang | 363/89 |
| 7,212,418 B1 * | 5/2007 | Hsu et al. | 363/53 |
| 8,040,698 B2 * | 10/2011 | Hyuugaji | 363/21.14 |
| 8,072,787 B2 * | 12/2011 | Yang et al. | 363/127 |
| 2007/0201253 A1 * | 8/2007 | Endo et al. | 363/127 |
| 2008/0001635 A1 * | 1/2008 | Miyake | 327/54 |
| 2008/0165041 A1 * | 7/2008 | Parkes et al. | 341/143 |

FOREIGN PATENT DOCUMENTS

| | | |
|---|---|---|
| JP | 2005-348567 A | 12/2005 |
| JP | 2008-113473 A | 5/2008 |

* cited by examiner

*Primary Examiner* — Adolf Berhane
*Assistant Examiner* — Jeffrey Gblende
(74) *Attorney, Agent, or Firm* — Manabu Kanesaka

(57) ABSTRACT

A synchronous rectification control device achieves high power conversion efficiency without supplying additional signal to a secondary side from a primary side. An insulated type switching power supply provides such a synchronous rectification control device. An output power is regulated based on a phase difference between two half bridges in the primary side. In the secondary side of the full bridge converter circuit, a center tap is lead out from the secondary windings of a transformer to obtain two symmetrical sections of windings. A device for detecting winding voltage observes winding voltages at terminals of the sections of windings. The synchronous rectification control circuit controls transistors and MOSFETs connected to the secondary windings to make the transistor in the ON or OFF state depending on the current flow in the secondary windings.

12 Claims, 13 Drawing Sheets

US 8,411,470 B2

SYNCHRONOUS RECTIFICATION CONTROL DEVICE, METHOD FOR SYNCHRONOUS RECTIFICATION CONTROL, AND INSULATED TYPE SWITCHING POWER SUPPLY

CROSS-REFERENCE TO RELATED APPLICATION

This application is based on, and claims priority of, Japanese Patent Application No. 2009-222725, filed on Sep. 28, 2009, contents of which are incorporated herein by reference.

BACKGROUND OF THE INVENTION

The present invention relates to synchronous rectification control device in an insulated type switching power supply and a method of controlling the insulated type switching power supply in which switching elements in the primary side circuit are ON/OFF controlled and synchronous rectification is conducted in the secondary circuit to obtain a specified constant voltage DC output.

An insulated type switching power supply is a type of a commonly known converter in which an input (primary) side and an output (secondary) side are insulated by a transformer, switching elements provided in the primary side being ON/OFF operated to transfer energy to the secondary side through the transformer, and a rectifying circuit provided in the secondary side provides a constant voltage DC output A structure called a full bridge converter is known for constructing an insulated type converter. A full bridge converter, shown in FIG. 8A for example, constructs a full bridge with four switching elements, transistors Tr1, Tr2, Tr3, and Tr4, which are generally MOSFETs (metal oxide semiconductor field effect transistors). In classical PWM control, transistors Tr1 and Tr4 are simultaneously turned ON generating a positive output and transistors Tr2 and Tr3 are simultaneously turned ON generating a negative output. An output voltage is controlled by varying a time percentage (a duty ratio), which is a percentage of ON period of each transistor Tr1, Tr2, Tr3 or Tr4 in a total time of ON period and OFF period. This control scheme may create a high impedance condition between both terminals of a load connected to the full bridge circuit, which is problematic in the case with a load including an inductance element. Accordingly, a phase shift scheme is often employed (see Non-patent Document 1, Patent Documents 2 and 3).

A phase shift full bridge converter, among various types of power converting schemes, is attracting attention for possibility of high output power, and nowadays employed extensively. A phase shift full bridge converter holds a time percentage of each of two half bridges, one half bridge having Tr1 and Tr2 and the other half bridge having Tr3 and Tr4, to be a fixed value of 50%. A specified output is obtained by adjusting a phase shift degree of ON/OFF operation of the two half bridges. The phase shift degree varies a time percentage of "a period in which a voltage equivalent to an input voltage is applied between both terminals of a load connected to the full bridge circuit" in a total period of this period and "a period in which voltages at both terminals are equal."

FIG. 8A shows a structure of a known phase shift full bridge converter. A full bridge circuit in FIG. 8A comprises four switching elements that are MOSFET transistors Tr1 (101), Tr2 (102), Tr3 (103), and Tr4 (104) as described above. The four transistors Tr1 to Tr4 are operated such that the two half bridges having Tr1 and Tr2 and having Tr3 and Tr4 are held at a time percentage of fixed value of 50%, and a phase of ON/OFF operation of the two half bridges is shifted by supplying a gate of each transistor with a control signal from a phase shift control IC (150) through a pulse transformer 111 or 112. A pulse voltage is given to a primary winding of a transformer 120 from a node 113 of a source terminal of the transistor Tr1 (101) and a drain terminal of the Tr2 (102) through an inductor Lz (105) for soft switching; and another pulse voltage is given to the primary windings of the transformer 120 from a node 114 of a source terminal of the transistor Tr3 (103) and a drain terminal of the transistor Tr4 (104) through a capacitor 106. The control system finally transfers energy to a smoothing reactor 131 and a smoothing capacitor 132 provided in the secondary side through a secondary windings of the transformer 120. The whole of the secondary windings of the transformer 120 is divided into two opposing sections of windings. The two sections of windings are connected to a rectifying diode 141 and a rectifying diode 142 from two distinct terminals of the two sections of windings. Since a commercially available phase shift control IC (150) is used, details thereof are not described here.

The phase shift full bridge converter of FIG. 8A gives a specified constant voltage DC output by rectifying the output of the secondary windings using the rectifying diodes 141 and 142. FIG. 8B on the other hand shows a phase shift full bridge converter to which a synchronous rectifying scheme is applied. The converter of FIG. 8B uses switching elements 161 and 162 of MOSFET transistors, for example, in place of the rectifying diodes 141 and 142. A synchronous rectification control circuit 160 controls to turn ON the switching elements 161 and 162, according to a signal from a timing detection means (not shown in the figure) provided in the primary side circuit, at timings of the conventional electrical continuity of diodes. A synchronous rectification system of such a construction is intended to improve power conversion efficiency.

In a converter employing the synchronous rectification system of FIG. 8B for improving power conversion efficiency, it is important to control a forward current in the diodes connected in parallel to the MOSFETs of switching elements 161 and 162 to flow in the main switching elements of the MOSFETs as much as possible by means of a synchronous rectification control circuit 160. Besides, the diodes accompanying the switching elements 161 and 162 must block reversed current. Therefore, it is critical to control timings of turning ON/OFF the MOSFETs of synchronous rectifying transistors by the synchronous rectification control circuit 160.

Some systems employing synchronous rectification scheme in the secondary side are known as described below. FIG. 9 shows an example (referred to as 'a conventional system (1)' in the following description) in which voltages of the opposing sections of windings in the secondary side obtained through resistors 171 and 172 are directly utilized for gate signals to synchronous rectification switches 161 and 162 in the secondary side. An example employing the conventional system (1) is disclosed as FIG. 1 in Patent Document 1. In FIG. 1 of Patent Document 1, synchronous rectification transistors Q1 and Q2, which are MOSFETs having inverse parallel diodes, are connected to secondary windings of a transformer XFRMR. The secondary windings drive an LC circuit composing an output section. The synchronous rectification transistors Q1 and Q2 in this construction are connected in a configuration of so-called cross-connected switches, which means that gate electrodes are connected to opposite terminals of the secondary windings of the transformer XFRMR.

FIG. 10 shows another example (referred to as 'a conventional system (2)' in the following description) employing a synchronous rectification scheme in the secondary side. A phase shift control IC (150) in the conventional system (2) transfers timing signals as same as those for a primary side switching control directly to gate terminals of secondary side synchronous rectification switches 161 and 162 through drivers 181 and 182.

Patent Document 1
Japanese Patent No. 409-4727 (FIG. 1 in particular)
Patent Document 2
Japanese Unexamined Patent Application Publication No. 2005-348567
Patent Document 3
Japanese Unexamined Patent Application Publication No. 2008-113473
Non-patent Document 1
Tamotsu Inaba: "Manufacturing a phase shift PWM scheme ZVS variable power supply" (in Japanese) in a journal "Transistor Technology" published by CQ Publishing Co., Ltd., Vol. 41, No. 6, pages 228-236, Jun. 1, 2004.

The conventional full bridge converters employing a secondary side synchronous rectification scheme as shown in FIG. 9 and FIG. 10 have the following problems when a phase shift scheme is applied to the converters. FIG. 11A shows operation waveforms and synchronous rectification capability range of a phase shift full bridge converter of the conventional system (1) as shown in FIG. 9 employing a secondary side synchronous rectification scheme. The waveforms indicated by the symbols $V_{NP}$, $V_{DS2}$, $V_{DS1}$, and $I_{NS1}$ are voltage and current waveforms corresponding to the voltages and a current indicated by the same symbols in FIG. 8B. FIG. 11B shows operation waveforms and synchronous rectification capability range of a phase shift full bridge converter of the conventional system (2) as shown in FIG. 10 employing a secondary side synchronous rectification scheme. The waveforms indicated by the symbols $V_{NP}$, $V_{DS2}$, $V_{DS1}$ and $I_{NS1}$ are voltage and current waveforms corresponding to the voltages and a current indicated by the same symbols in FIG. 8B like for the case of FIG. 11A. FIG. 11A and FIG. 11B show an operation only in one of the two sections of the secondary windings. An operation in the other section of the windings is similar to the operation in FIG. 11A and FIG. 11B, so the illustration is omitted.

The conventional system (1) shown in FIG. 9 employing a secondary side synchronous rectification scheme cannot supply current in the MOSFETs of the secondary side synchronous rectifying switches in a substantial period out of the total current-flowing period as shown in FIG. 11A resulting in generation of rather large losses. This is a problem that actual capability range of synchronous rectification is substantially narrow in comparison with an ideal synchronous rectification capability range.

The conventional system (2) shown in FIG. 10 employing the secondary side synchronous rectification scheme cannot manage the remaining current ($I_{NS1}$ flowing in the period td indicated in FIG. 11B) flowing due to affection of the inductance of the inductor Lz (105) for ZVS (zero voltage switching) and the parasitic inductance (not illustrated) to flow in the secondary side synchronous rectification switch 161. This situation too, generates rather large losses, and has a problem that the actual capability range of synchronous rectification is substantially narrow in comparison with an ideal synchronous rectification capability range, like in the conventional system (1). In operation of the conventional system (2), the current $I_{NS1}$ and $I_{NS2}$ does not flow in completely exclusive manner; 'completely exclusive' means that when a current is flowing in one of the two circuits, the other circuit carries zero current. At a moment of reversing a voltage $V_{NP}$ applied to the primary windings, that is, a moment the voltage $V_{NP}$ that has been null until this moment starts to rise up or fall down, a current in one section of the secondary windings that has been mainly carrying whole current does not abruptly vanishes, but attenuates rapidly in a period td. The other section of the secondary windings carries a current rapidly increasing corresponding to the attenuating current. Thus, the current corresponding to the attenuating current cannot be carried by the secondary side synchronous rectifying switch in the period td during which the current carried by the section of the secondary windings that has been conducting substantially whole current.

In addition, means for signal transfer from a primary side circuit to a secondary side circuit (for example, the drivers 181 and 182) is necessary. Moreover, the transfer means needs to be an insulated type in an insulated type power supply. Thus, there exist problems in a number of parts, a layout area, and a cost increase.

It is therefore an object of the present invention to provide a synchronous rectification control device, a control method, and an insulated type switching power supply capable of synchronous rectification control with high power conversion efficiency without supplying additional signal to the secondary side from the primary side.

Further objects and advantages of the invention will be apparent from the following description of the invention.

SUMMARY OF THE INVENTION

In order to solve the above-described problems, a synchronous rectification control device according to the present invention comprises: means for detecting a winding voltage that detects an edge of a first winding voltage of a first section of windings in a secondary side of a transformer and an edge of a second winding voltage of a second section of windings in the secondary side of the transformer; means for measuring a period between the edges detected by the means for detecting winding voltage; and means for estimating an OFF timing for a synchronous rectification switch based on the period obtained by the means for measuring a period.

A method of synchronous rectification control according to the present invention comprises: a step of detecting winding voltage including a process that detects an edge of a first winding voltage of a first section of windings in a secondary side of a transformer and a process that detects an edge of a second winding voltage of a second section of windings in the secondary side of the transformer; a step of measuring a period between the edges detected in the step of detecting winding voltage; and a step of estimating an OFF timing for a synchronous rectification switch based on the period obtained in the step of measuring a period.

An insulated type switching power supply according to the present invention, in which a primary side and a secondary side are insulated by a transformer, has a synchronous rectification control device that comprises: means for detecting winding voltage that detects rising up and falling down edges of a first winding voltage of a first section of windings in a secondary side of the transformer and rising up and falling down edges of a second winding voltage of a second section of windings in the secondary side of the transformer; means for measuring a period between the edges detected by the means for detecting winding voltage; and means for estimating an OFF timing for a synchronous rectification switch based on the period obtained by the means for measuring a period.

According to a synchronous rectification control device and a control method, the edges of start of rising up and falling down of voltage in two sections of secondary windings of a transformer are detected and grasped in combination, thereby giving an optimum OFF timing. As a result, the losses in a synchronous rectification section in the secondary side are reduced to the minimum. The present invention, employing the synchronous rectification control device and the control method, Provides an insulated type switching power supply capable of synchronous rectification control achieving high power conversion efficiency, not requiring supply of an additional signal to the secondary side from the primary side.

DETAILED DESCRIPTION OF INVENTION

Now, the preferred embodiments according to the present invention will be described in detail in the following.

The following description of the present invention will be made on an example of a phase shift full bridge converter employing phase shift scheme in the primary side, which is widely used for an insulated type switching power supply. In particular, a detailed description will be made about a synchronous rectification control in the secondary side of a phase shift full bridge converter.

Figure 1:
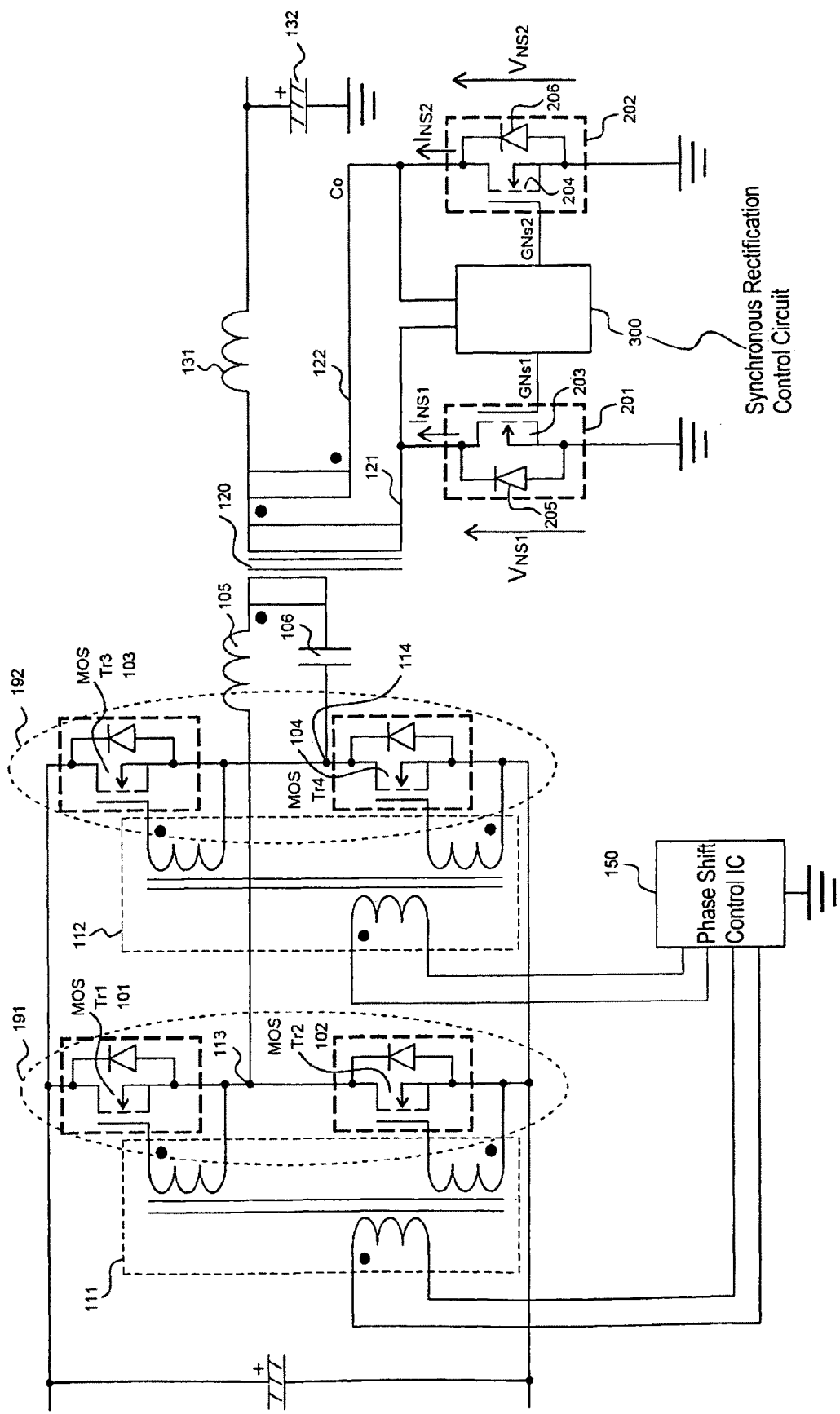
FIG. 1 is a block diagram showing a construction of a phase shift full bridge converter according to an embodiment of the present invention.

FIG. 1 is a block diagram showing a construction of a phase shift full bridge converter according to an embodiment of the present invention. Referring to FIG. 1, the primary side of the phase shift full bridge converter employs a phase shift scheme and terminals 121 and 122 of the secondary windings of the converter are connected to switch 1 (201) and switch 2 (202) respectively, which are controlled by a synchronous rectification control circuit 300. A secondary side synchronous rectification section is composed of the switch 1 (201) and switch 2 (202) that include synchronous control transistors of MOSFETs 203 and 204 and body diodes 205 and 206 connected between a source and a drain of each MOSFET.

The synchronous rectification control circuit 300 is provided with a means for detecting voltages $V_{NS1}$ and $V_{NS2}$ at the terminals 121 and 122 of the secondary windings of a transformer 120. The means for detecting voltages $V_{NS1}$ and $V_{NS2}$ is also referred to as "a means for detecting winding voltage". The means will be described afterwards. The synchronous rectification control circuit 300, and switch 1 (201) and switch (202) can be constructed in one or two module structure or in a so-called discrete structure with a set of independent components.

The phase shift full bridge converter shown in FIG. 1 according to an embodiment of the present invention is controlled to adjust the output power based on a phase difference between the two half bridges 191 and 192. In the secondary side of the full bridge converter circuit, a tap is lead out from an approximately central position of the secondary windings of the transformer 120 so as to produce two symmetrical sections of windings (a center tap structure). Winding voltages $V_{NS1}$ and $V_{NS2}$ at the terminals 121 and 122 of the windings are observed by the means for detecting winding voltage (further description thereon will be made afterwards with reference to FIG. 5 and FIG. 7) provided in the synchronous rectification control circuit 300.

Figure 2:
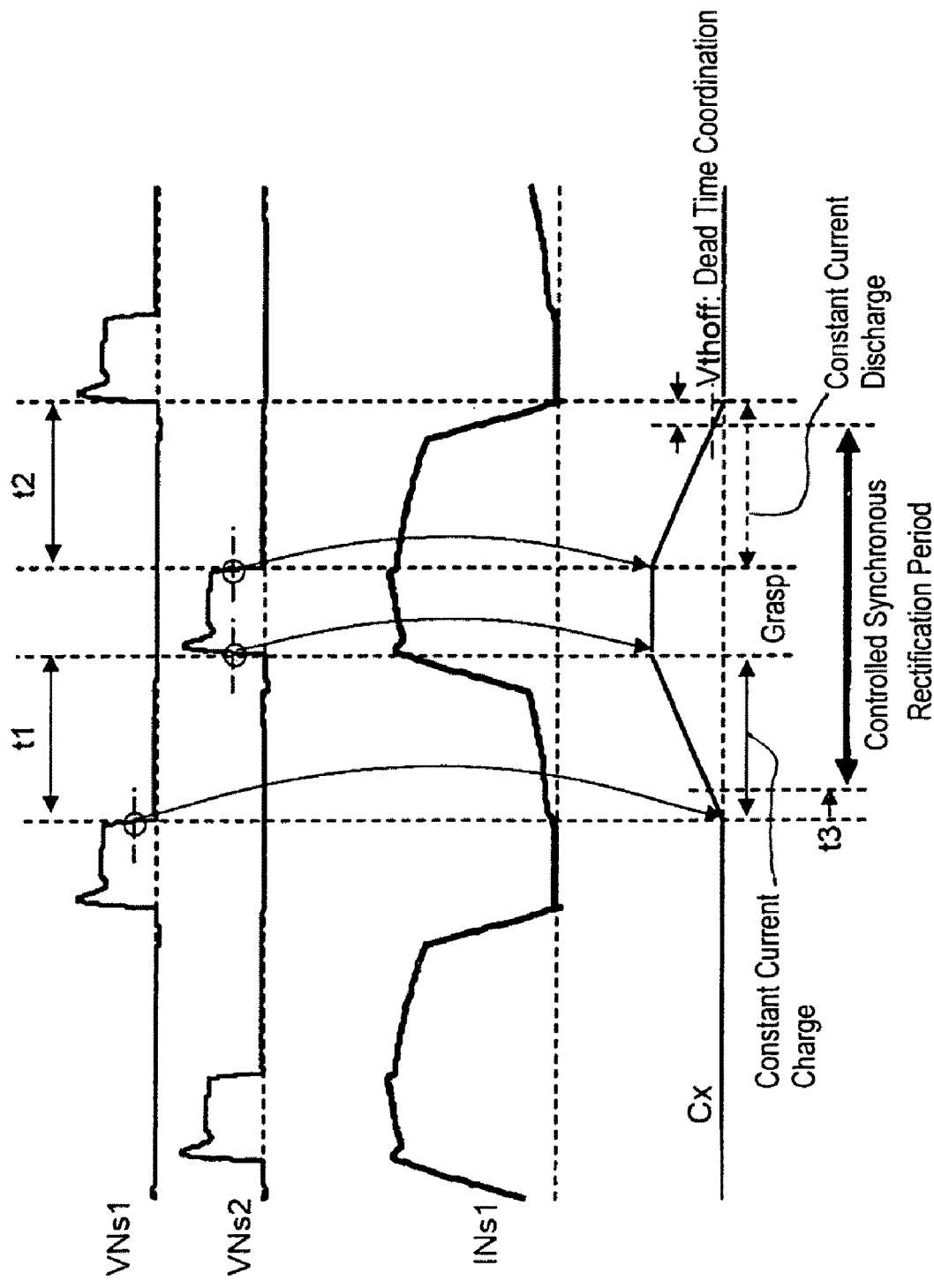
FIG. 2 is a timing chart showing voltage and current waveforms in a steady state at some parts of the phase shift full bridge converter of FIG. 1 according to an embodiment of the present invention.

FIG. 2 is a timing chart showing voltage and current waveforms in a steady state at some parts of the phase shift full bridge converter of FIG. 1, according to an embodiment of the present invention. As shown in FIG. 2, the period t1 is a time duration from a moment of start of falling down of the (first) winding voltage $V_{NS1}$, which corresponds to start of flow of current $I_{NS1}$, to a moment of start of rising up of the (second) winding voltage $V_{NS2}$. The period t2 is a time duration from a moment of start of falling down of the (second) winding voltage $V_{NS2}$ to a moment of start of rising up of the (first) winding voltage $V_{NS1}$, which corresponds to a disappearance of the current $I_{NS1}$.

The synchronous rectification control circuit 300 shown in FIG. 1 executes the following operation based on the fact that the periods t1 and t2 described above are theoretically equal. When the means for detecting winding voltage provided in the synchronous rectification control circuit 300 detects an edge of falling down of the (first) winding voltage $V_{NS1}$, the capacitor Cx provided in the synchronous rectification control circuit 300 begins to be charged with a constant current as shown by the waveform at the bottom in FIG. 2. After an arbitrary delay time t3, which can be null, the switch 1 (201) is turned to an ON state.

When the means for detecting winding voltage in the synchronous rectification control circuit 300 detects an edge of rising up of the (second) winding voltage $V_{NS2}$, the charging of the capacitor Cx provided in the synchronous rectification control circuit 300 is stopped to hold the voltage at that moment as shown by the better waveform at the bottom in FIG. 2. When the means for detecting winding voltage in the synchronous rectification control circuit 300 detects an edge of falling down of the (second) winding voltage $V_{NS2}$, the capacitor Cx provided in the synchronous rectification control circuit 300 begins to be discharged with a constant current as shown by the waveform at the bottom in FIG. 2. When the voltage of the capacitor Cx provided in the synchronous rectification control circuit 300 becomes equal to a threshold voltage Vthoff that determines an OFF timing, the switch 1 (201) is turned to an OFF state. Charging and discharging operation for the capacitor Cx will be described afterwards. The above-described series of operations can yield the optimum OFF timing. As for the switch (202), another set of similar circuit is prepared, which executes the same series of operations as described above, on the switch 2 (202).

In a modification to the above-described embodiment within the present invention, a different arbitrary value can be set for the voltage threshold value Vthoff, which determines the OFF timing, to turn OFF the switch at an earlier OFF timing than a preliminarily estimated timing taking into consideration of delay time in control and a time for switching the switch. In an embodiment of the invention, the electric current values for charging and discharging the capacitor Cx provided in the synchronous rectification control circuit 300 are not necessarily equal to each other. This is because the time durations of the period t1 and the period t2 are possibly different from each other in a transient state, requiring a correction of discharging current according to discharged electric charges. In addition, the discharging current can be set at a larger value than the charging current to make the period t2 shorter than the period t1, thereby obtaining a dead time without using the voltage threshold value Vthoff.

Figure 4:
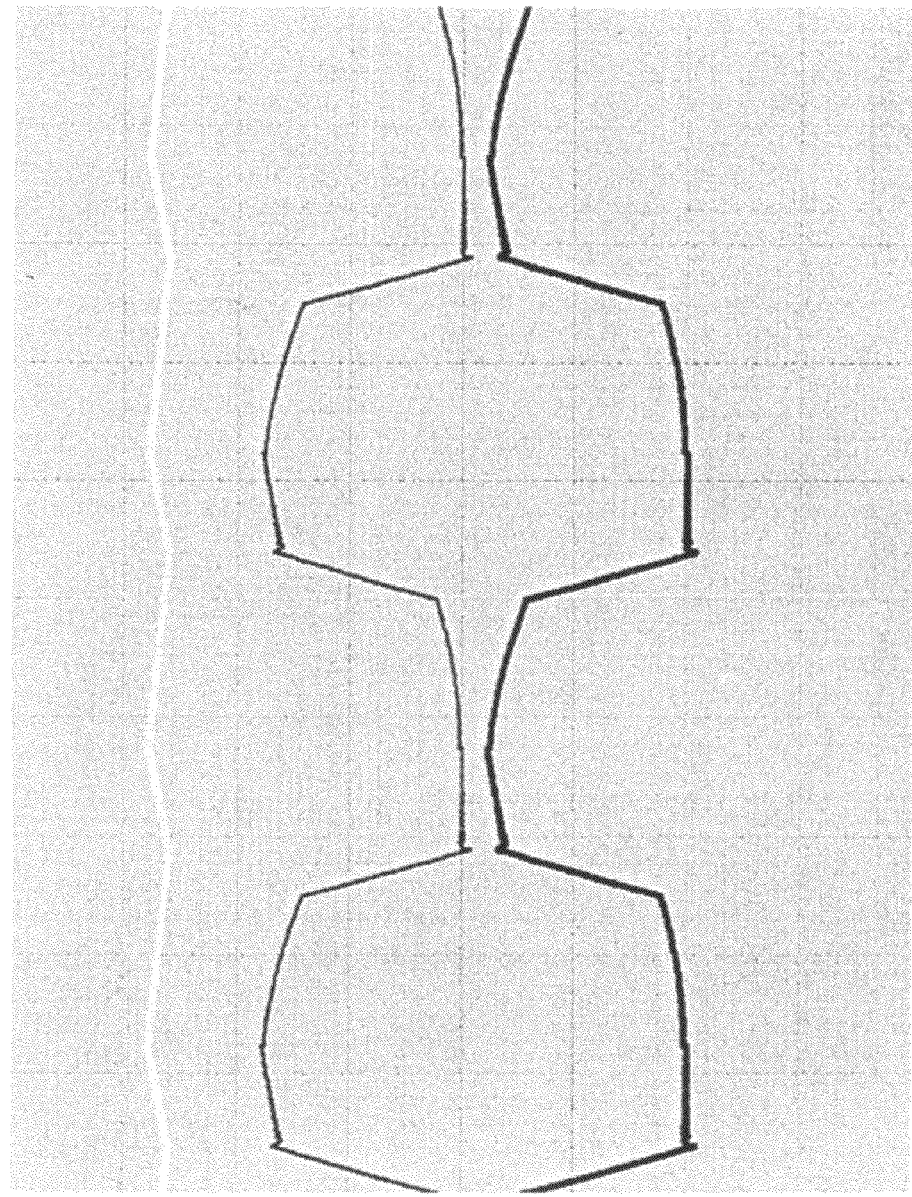
FIG. 4 shows waveforms of a current in the inductor Lo and related current in the secondary side in an embodiment of the present invention.

FIG. 4 shows waveforms of a current in the inductor Lo (131) and related current in the secondary side in an embodiment of the invention. Referring to the waveforms in FIG. 4, the current in the inductor Lo (131) of the smoothing reactor in the secondary side is a sum of the current $I_{NS1}$ in the switch 1 (201) and the current $I_{NS2}$ in the switch 2 (202). Observing solely the waveform of the current in the inductor Lo (131) of the secondary side smoothing reactor, this waveform has a similar configuration to a current waveform in an output side inductor provided in an ordinary switching power supply in which the inductor current increases with a constant gradient when the switching transistor is ON and decreases with a constant gradient when the switching transistor is OFF.

Figure 8A:
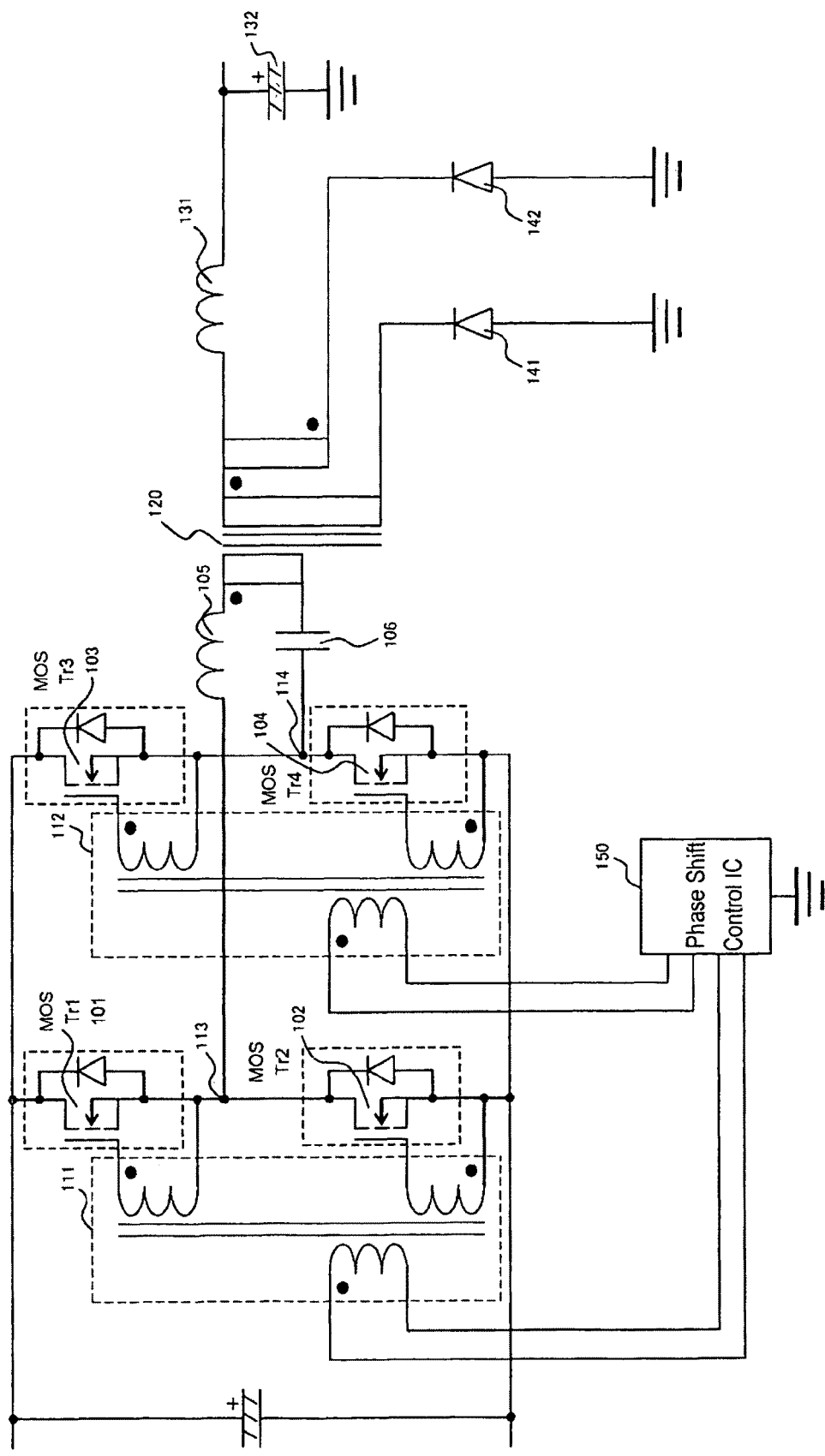
FIG. 8A shows a common construction of a known phase shift full bridge converter.
Figure 8B:
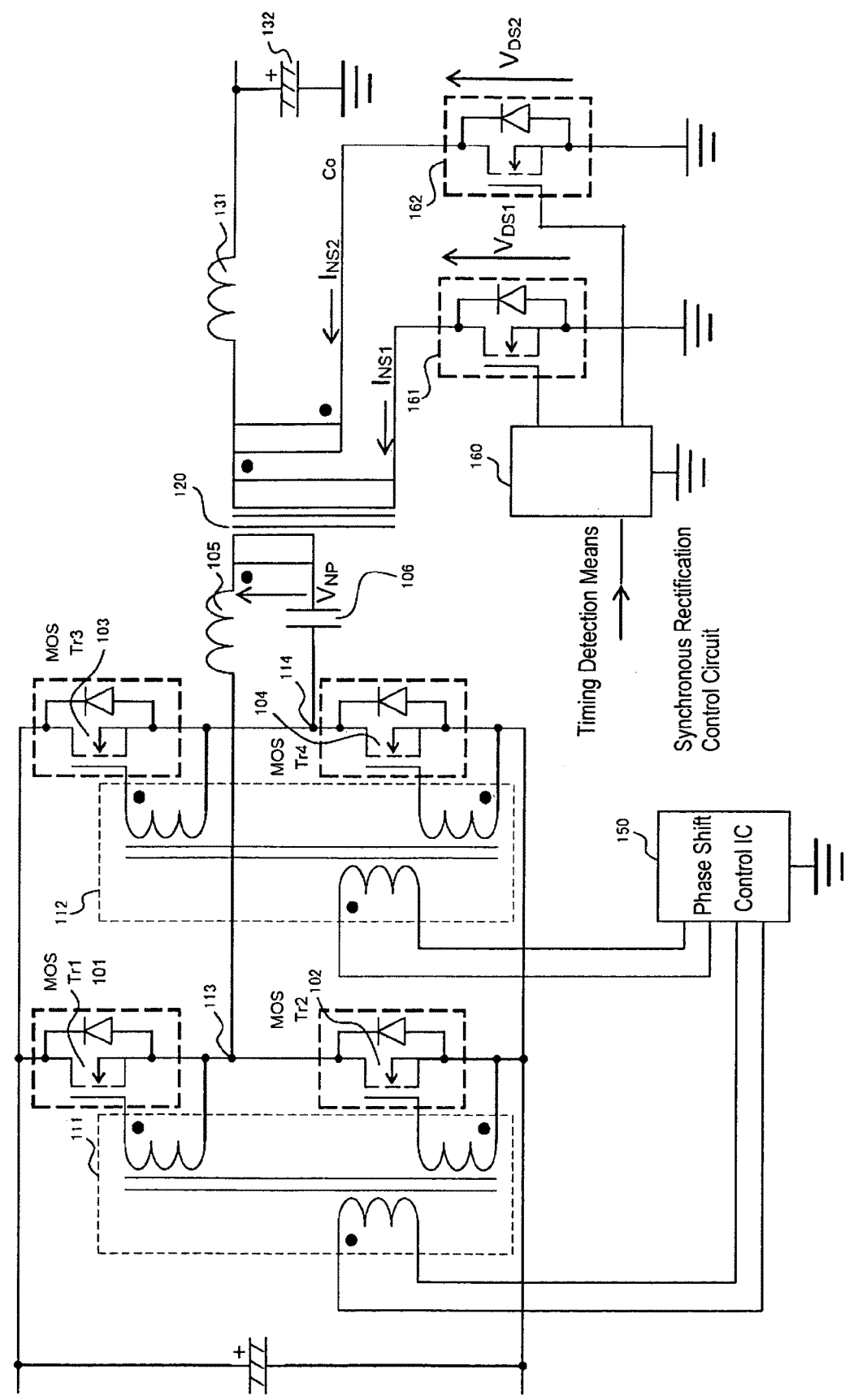
FIG. 8B shows an example of construction of the phase shift full bridge converter of FIG. 8A to which a synchronous rectifying scheme is applied.
Figure 9:
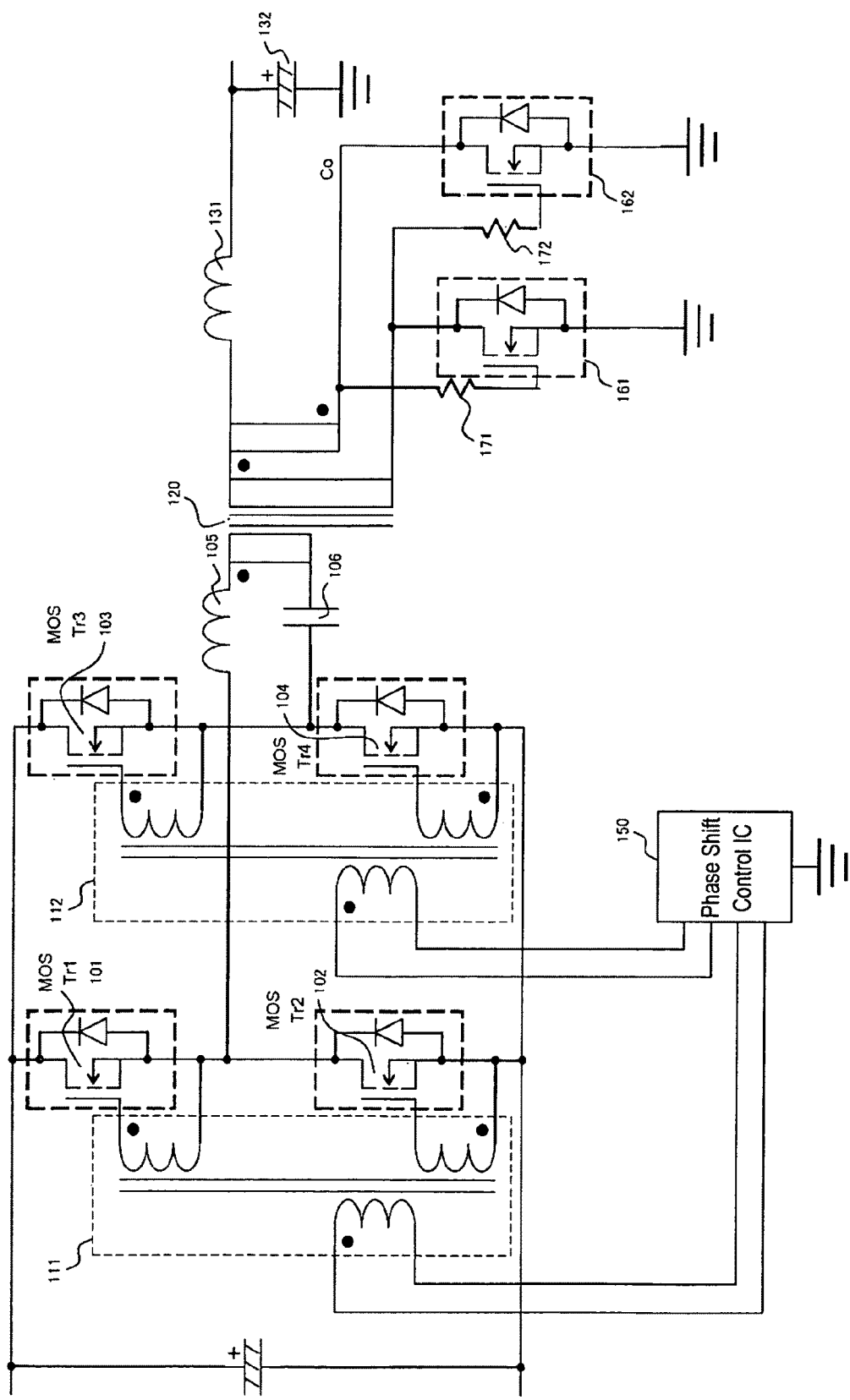
FIG. 9 shows an example of construction of a first conventional system (conventional system (1)) employing a synchronous rectification scheme in the secondary side.
Figure 10:
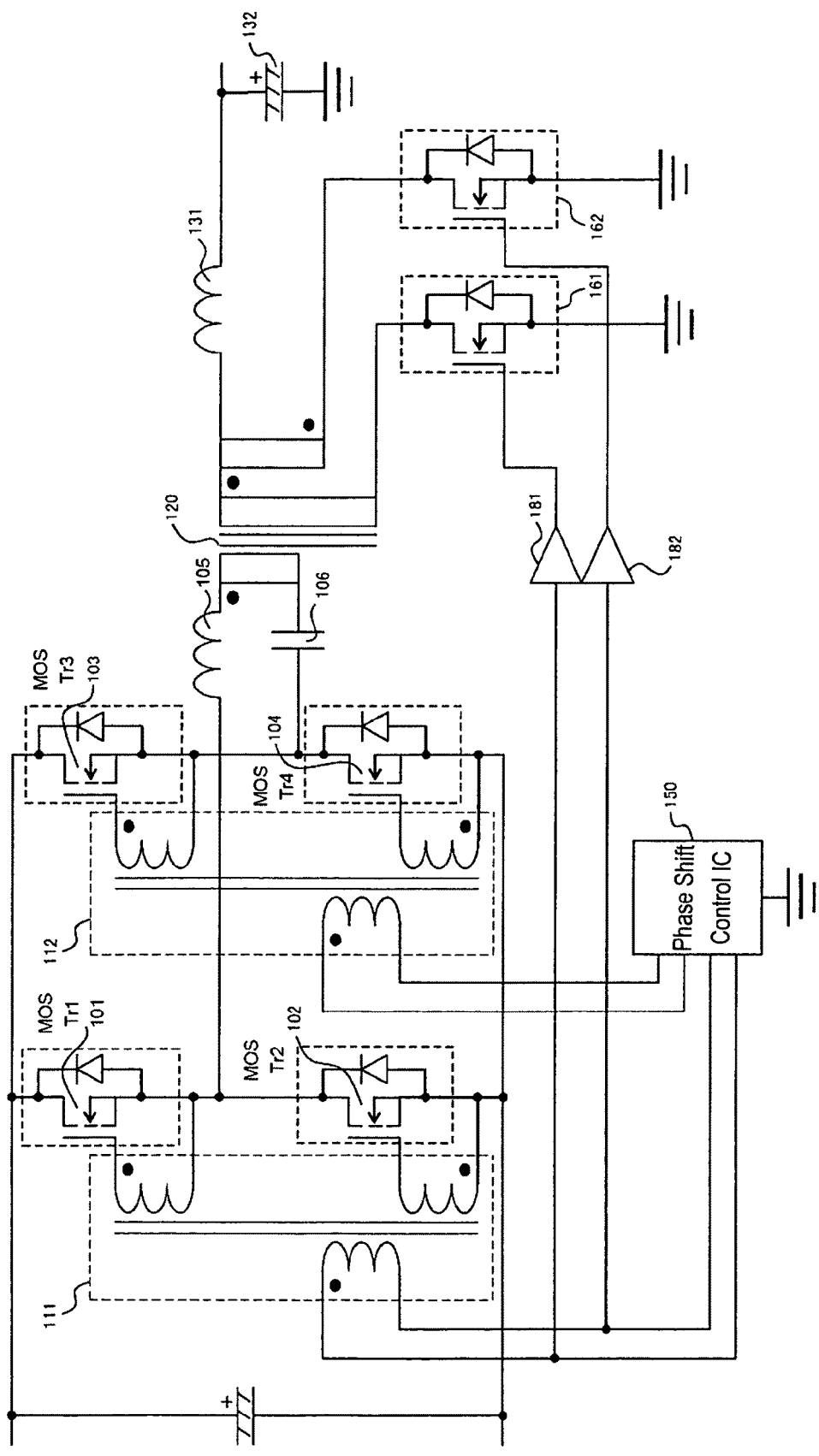
FIG. 10 shows an example of construction of a second conventional system (conventional system (2)) employing a synchronous rectification scheme in the secondary side.
Figure 11A:
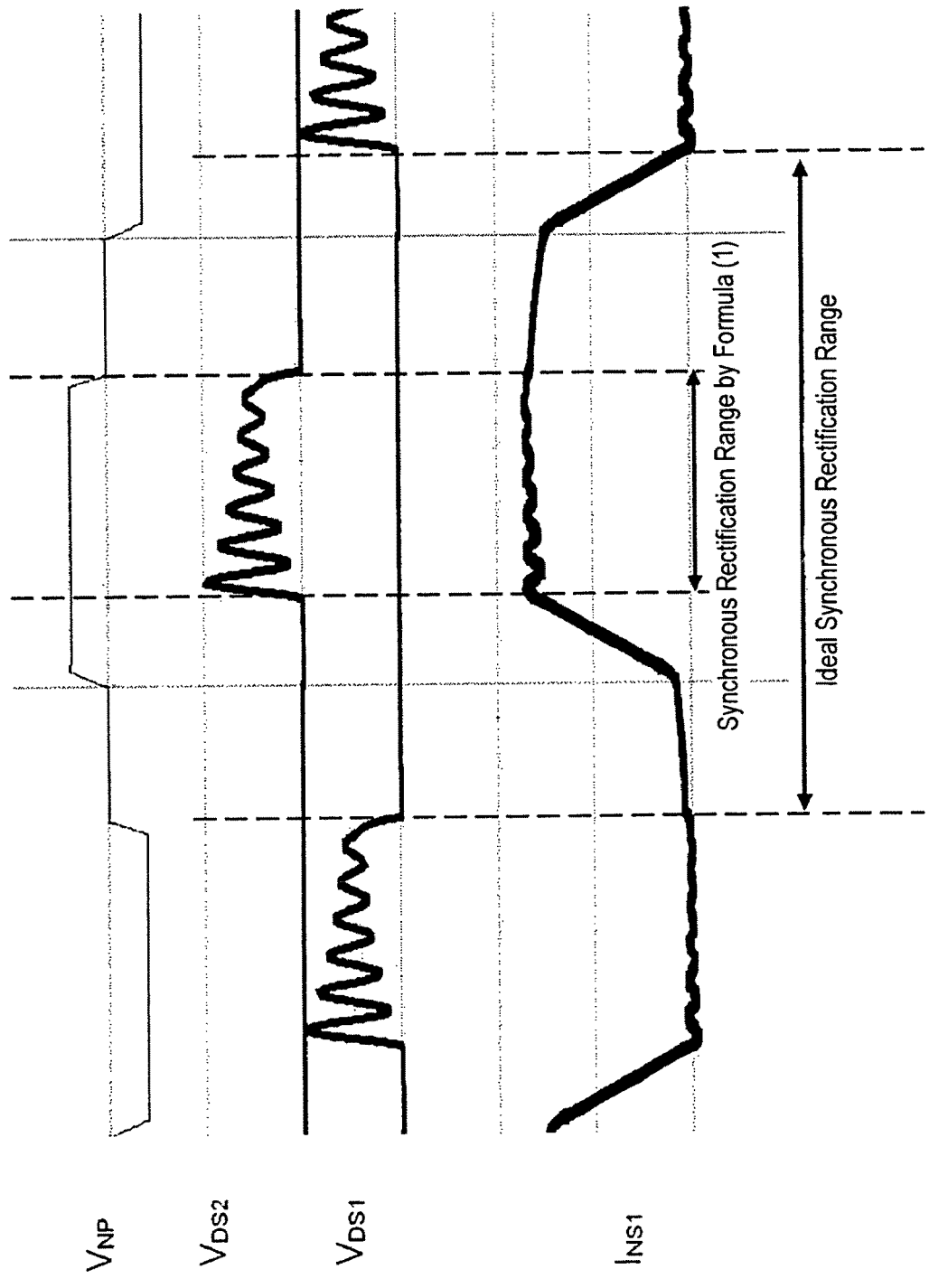
FIG. 11A shows operation waveforms and synchronous rectification capability range of a phase shift full bridge converter of the conventional system (1) as shown in FIG. 9 employing a secondary side synchronous rectification scheme.
Figure 11B:
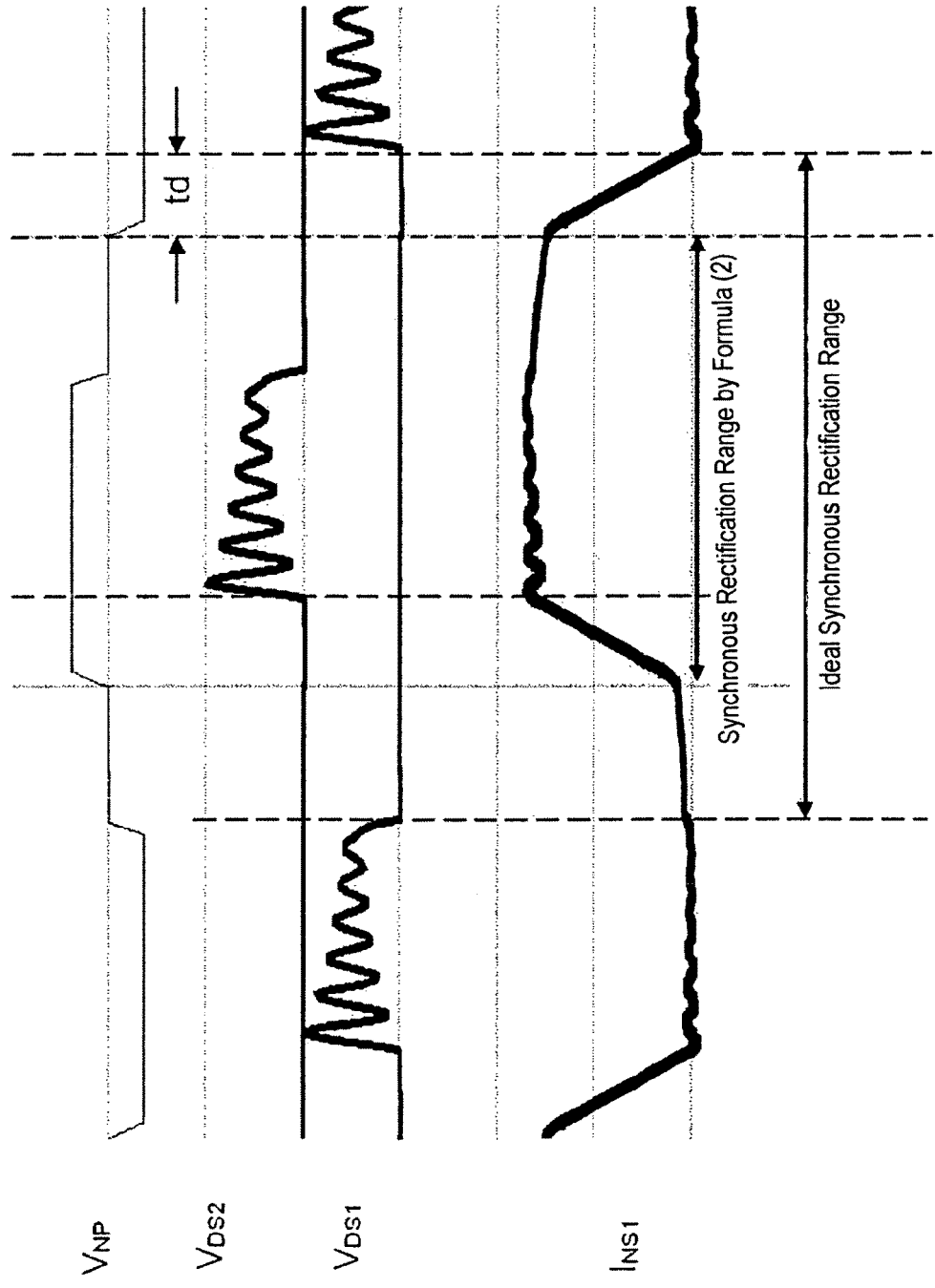
FIG. 11B shows operation waveforms and synchronous rectification capability range of a phase shift full bridge converter of the conventional system (2) as shown in FIG. 10 employing a secondary side synchronous rectification scheme.

It should be noted that the current $I_{NS1}$ and the current $I_{NS2}$ do not flow in a completely exclusive way. An exclusive current flow means that in the period of finite current value of one of the current $I_{NS1}$ and the current $I_{NS2}$, the value of the other current is zero. When a primary side control circuit, for example, the phase shift control IC 150 in FIG. 1, reverses the direction of the voltage $V_{NP}$ (see FIG. 8B) applied to the primary windings, that is, when the voltage $V_{NP}$ starts to rise up or fall down from zero, the current in one section of secondary windings, say $I_{NS1}$, which has been passing substantially the whole current in the secondary windings, does not disappear abruptly, but attenuates rapidly in a finite time. Corresponding to this attenuating current, the current in the other section of secondary windings, $I_{NS2}$, rapidly increases. The sum of the current $I_{NS1}$ and the current $I_{NS2}$ results in the current in the inductor Lo (131) of the smoothing reactor in the secondary side as shown by the waveform at the top in FIG. 4. In this period of current transfer, though it is a short time, a large current flows in both sections of the secondary windings. If the synchronous rectification transistors MOSFETs 203 and 204 are in an OFF state, large current flows in the body diodes 205 and 206, lowering the power conversion efficiency. Accordingly in an embodiment of the invention, the synchronous rectification control circuit 300 controls both of the two synchronous rectification transistors MOSFETs 203 and 204 to be in an ON state at least in the period of current transfer.

Describing this situation with reference to FIG. 2, the synchronous rectification control circuit 300 shown in FIG. 1 controls so that the synchronous rectification transistors, MOSFETs 203 and 204, connected to the secondary windings are made in an ON state when any finite amount of current is flowing in the secondary windings, and are made in an OFF state when any current flow is inhibited. In FIG. 2, the period of zero value of the current $I_{NS1}$ is the period in which the synchronous rectification transistor, MOSFET 203, is inhibited to be in an ON state. A state of the current $I_{NS1}$ at a non-zero level in FIG. 2 shows a state in which a certain amount of current is flowing in the secondary windings. Note that illustration of current $I_{NS2}$ is omitted in FIG. 2.

Figure 3:
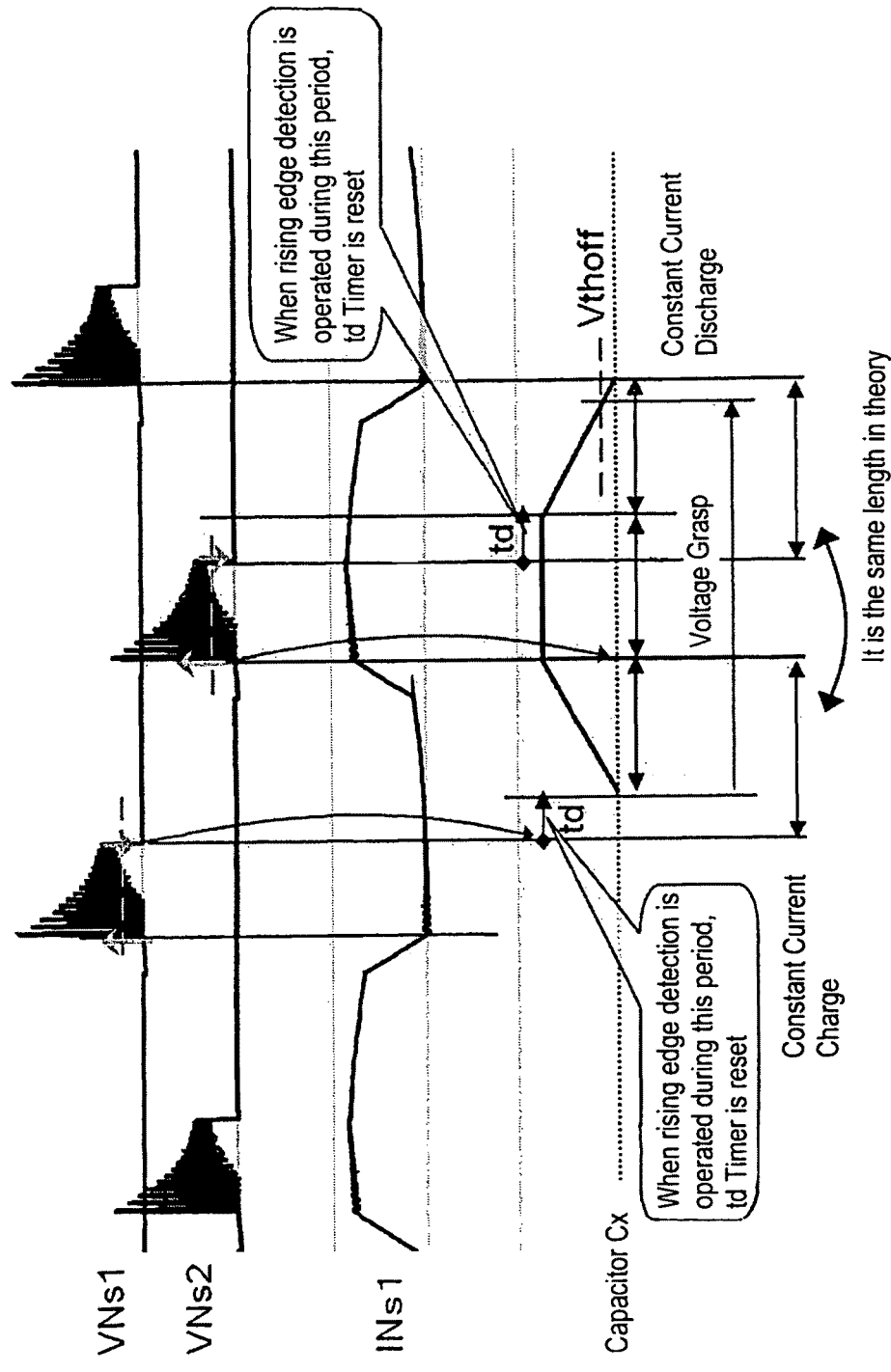
FIG. 3 shows waveforms in the case of a construction to disregard voltage ringing on a switching operation, which occurred in the secondary winding voltage, according to an embodiment of the present invention.

The synchronous rectification control circuit 300, where the edges are detected by the means for detecting winding voltage, sets a predetermined certain delay time td with respect to an edge of falling down of the (first) winding voltage $V_{NS1}$ or an edge of falling down of the (second) winding voltage $V_{NS2}$ in the secondary side of the transformer 120. If such an edge is detected in the period td, the td timer is reset (set again), and any advancement to the next operation is prohibited until the td timer operation finishes. This allows the voltage ringing, which is possibly occurring in the winding voltage at the time of switching as shown in FIG. 3, to be disregarded, and prevents malfunction due to the ringing. A means for measuring the period (or timer counting) to obtain a specified period of delay can be composed in an analog scheme as in an embodiment described later with reference to FIGS. 6A, 6B, or in a digital scheme as described afterwards.

Figure 5:
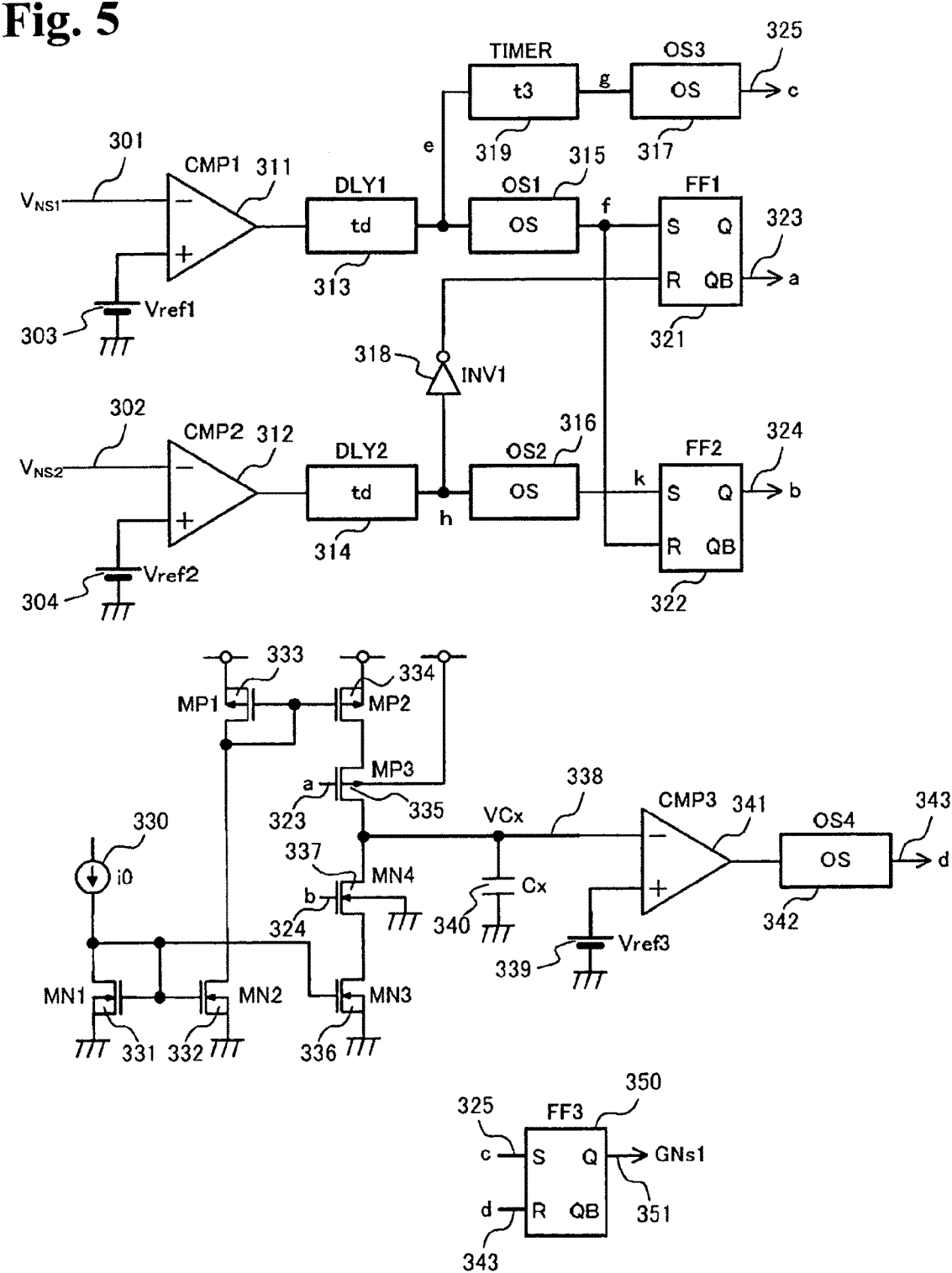
FIG. 5 shows a specific example of a circuit for charging and discharging the voltage VCx of the capacitor Cx in the synchronous rectification control circuit shown in FIG. 1.

FIG. 5 shows a specific example of a circuit for charging and discharging the capacitor Cx in the synchronous rectification control circuit 300 shown in FIG. 1. The circuit illustrated in the middle of FIG. 5 is a circuit for charging and discharging the capacitor Cx (340); the circuit illustrated in the top of FIG. 5 is a circuit for generating signals to control the charging and discharging circuit; and the flip flop illustrated at the bottom of FIG. 5 is a circuit for generating a signal $GN_S1$ to be applied to the gate of the synchronous rectification transistor, MOSFET 203.

Figure 6A:
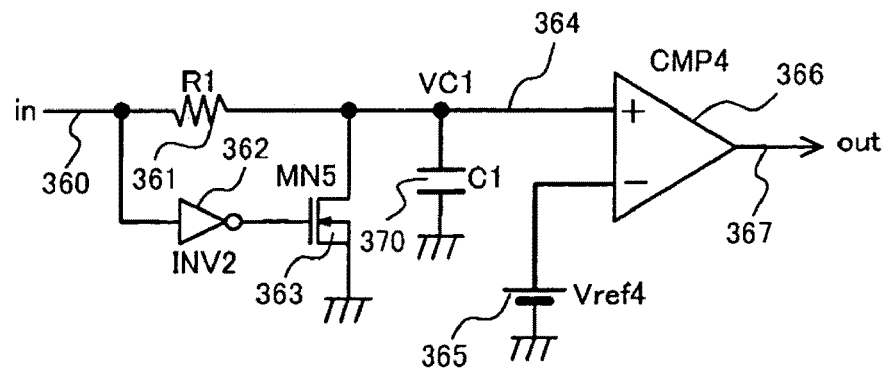
FIG. 6A shows a construction of the delay circuits DLY1 and DLY2 used in the circuit of FIG. 5.
Figure 6B:
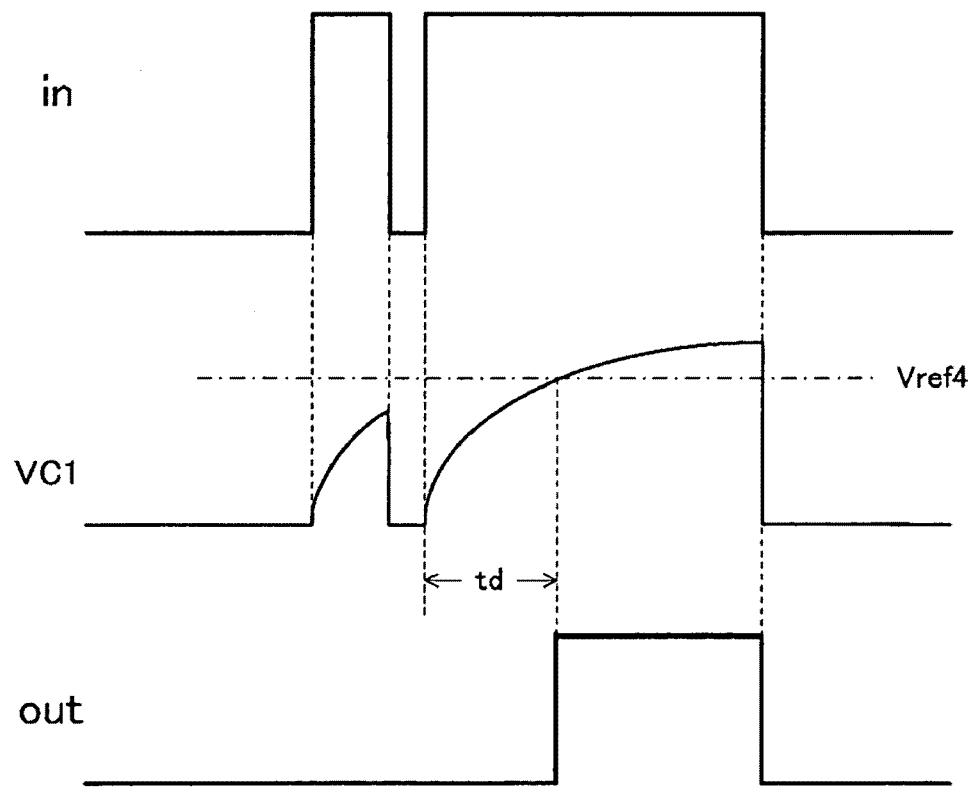
FIG. 6B shows a timing chart in the delay circuits.
Figure 7:
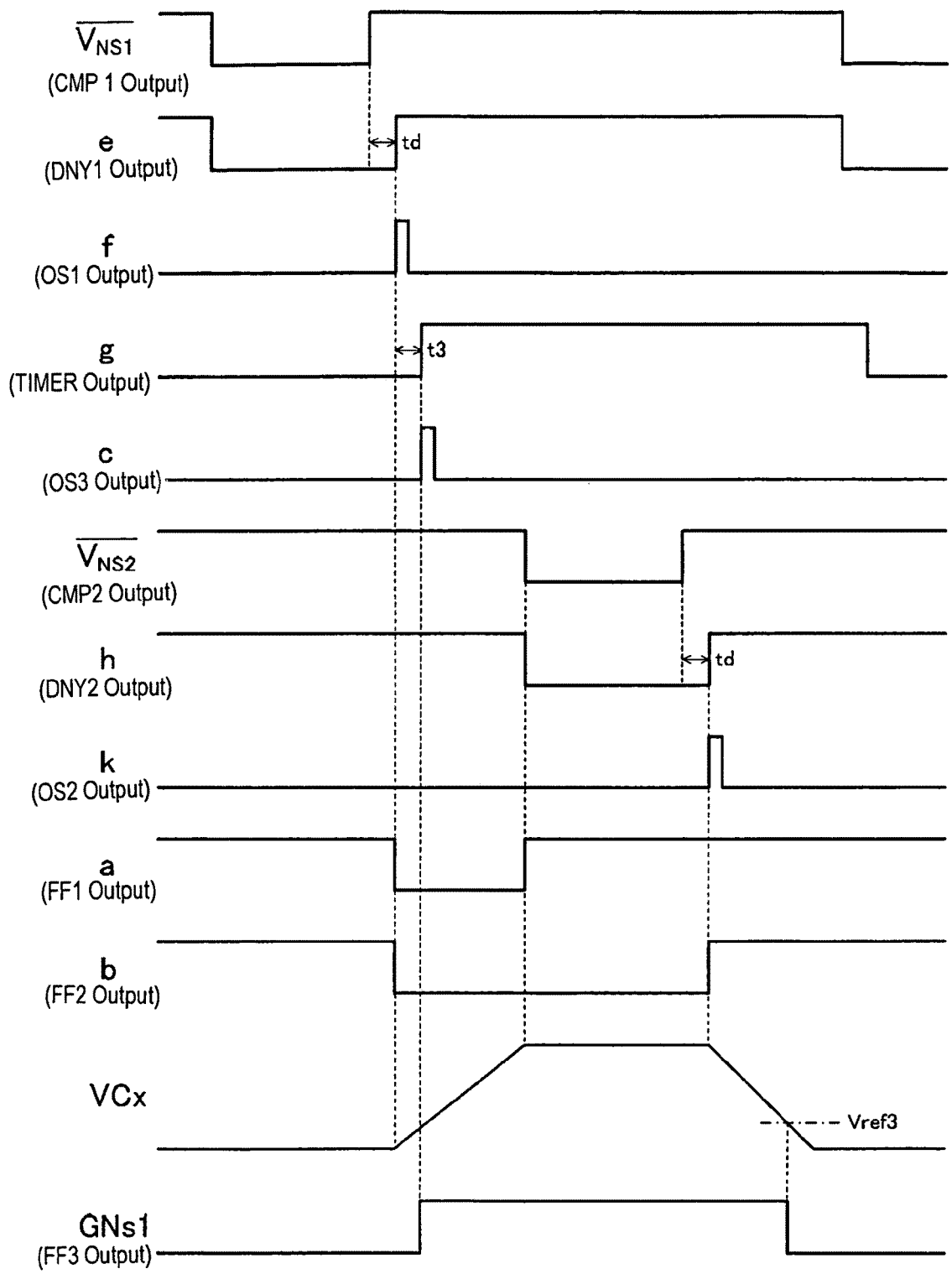
FIG. 7 is a timing chart showing waveforms at some parts in the circuit of FIG. 5.

FIG. 6A shows a construction of the delay circuits DLY1 (313) and DLY2 (314) used in the circuit of FIG. 5, and FIG. 6B shows a timing chart in the delay circuits. FIG. 7 is a timing chart showing waveforms at some parts in the $GN_S1$-generating circuit of FIG. 5.

Of the components of the circuit shown in FIG. 5, CMP1 (311), CMP2 (312), and CMP3 (341) are comparators; DLY1 (313) and DLY2 (314) are delay circuits with a resetting function; OS1 (315), OS2 (316), and OS3 (317) are one-shot circuits, one-shot multi vibrators; TIMER (319) is a delay circuit to change the output g to an H (high) state after a time duration t3 from a moment of start of rising up of input e, which is an output of DLY1 (313); FF1 (321), FF2 (322), and FF3 (350) are RS flip flops; Cx (340) is a capacitor; INV1 (318) is an inverter; MN1 (331), MN2 (332), MN3 (336), and MN4 (337) are N-channel MOSFETs; MP1 (333), MP2 (334), and MP3 (335) are P-channel MOSFETs; Vref1 (303), Vref2 (304), and Vref3 (339) are reference voltages or reference voltage power supplies for generating those voltages. Comparators CMP1 (311) and CMP2 (312) are preferably hysteresis comparators.

The means for detecting winding voltage for detecting winding voltages $V_{NS1}$ and $V_{NS2}$ at the winding terminals 121 and 122 as described previously are composed of a comparator CMP1 (311), which obtains a resulting output from the comparison of the (first) winding voltage $V_{NS1}$ (301) and the reference voltage Vref1 (303), and a comparator CMP2 (312), which obtains a resulting output from the comparison of the (second) winding voltage $V_{NS2}$ (302) and the reference voltage Vref2 (304), where the both comparators CMP1 (311) and CMP2 (312) being components of the circuit for generating signals for controlling the charging and discharging circuit is illustrated in the top of FIG. 5.

In the charging and discharging circuit illustrated in the middle of FIG. 5, the pair of MN1 (331) and MN2 (332), the pair of MP1 (333) and MP2 (334), and the pair of MN1 (331) and MN3 (336) each constructs a current mirror circuit. Based on the constant current from the constant current source io (330), a current for charging the Cx (340) is generated by the current mirror circuit of MN1 (331) and MN2 (332) and the current mirror circuit of MP1 (333) and MP2 (334), and a current for discharging the Cx (340) is generated by the current mirror circuit of MN1 (331) and MN3 (336). The charging and discharging current is turned ON/OFF by the P-channel MOSFET MP3 (335) and the N-channel MOSFET MN4 (337). The signals a (323) and b (324) for ON/OFF control of the MP3 (335) and MN4 (337) are generated by the circuit illustrated in the top of FIG. 5.

The flip flop FF3 (350) illustrated in the bottom of FIG. 5 is an RS flip flop. In operation, an output signal from the output terminal Q of the flip flop FF3 (350) is initiated (turning to H) by the signal c (325) that is the output from the one-shot circuit OS3 (317) illustrated in the top of the FIG. 5, and is terminated (turning to L) by the signal d (343) that is the output from the one-shot circuit OS4 (342) illustrated in the middle of the FIG. 5. In this way, the signal $GN_S1$ (351) is generated to be applied to the gate of the synchronous rectification transistor MOSFET 203 shown in FIG. 1, and the signal becoming an H state is generated in the synchronous rectification period shown in FIG. 2 and FIG. 3.

The specific example shown in FIG. 5 for charging and discharging the capacitor Cx (340) is a circuit for controlling the MOSFET 203, one of the two synchronous rectification transistors. For controlling the other synchronous rectification transistor MOSFET 204, one more set of similar circuit needs to be prepared. Description on the set of circuit is, however, omitted because the set of circuit is the same as the one illustrated in FIG. 5.

FIG. 7 is a timing chart showing waveforms at some parts in the circuit of FIG. 5. The circuit of FIG. 5 generates the signal $GN_S1$ outputted from the flip flop FF3 (350) illustrated in the bottom of FIG. 5 and applied to the gate of the synchronous rectification transistor, MOSFET 203, shown in FIG. 1, the signal being at an H state in the synchronous rectification period shown in FIG. 2 and FIG. 3. Accordingly, FIG. 7 merely illustrates operations relating to generation of signals a (323), b (324), c (325), and d (343).

Signal a (323), illustrated by the waveform at ninth line in FIG. 7, charges the capacitor Cx (340) by turning the value of the signal to L (low) to turn ON the P-channel MOSFET MP3 (335). An output of the comparator CMP1 (311) shown in FIG. 5 gives an inverted signal (illustrated by the waveform at the top in FIG. 7) of the winding voltage $V_{NS1}$ that is regulated because a value of the winding voltage $V_{NS1}$ is not necessarily favorable for operation of the synchronous rectification control circuit 300. This signal is inputted to the delay circuit DLY1 (313) with a resetting function. When this signal start to rise up, that is, when the winding voltage $V_{NS1}$ starts to fall down, after passing the time td, the output signal e (illustrated by the waveform at the second from the top in FIG. 7) from the delay circuit DLY1 (313) with a resetting function is inputted to the one-shot circuit OS1 (315).

An output signal f (illustrated by the third waveform in FIG. 7) from the one-shot circuit OS1 (315) is inputted to the set input terminal S of the RS flip flop FF1 (321) and the signal a (323) at an L (low) level is outputted from the inversion output terminal QB of the RS flip flop FF1 (321). This signal a (323) at an L (low) level is inputted to the gate of the P-channel MOSFET MP3 (335) illustrated in the middle of FIG. 5 and utilized for controlling to turn ON the P-channel MOSFET MP3 (335) and charge the capacitor Cx (340). The comparator CMP1 (311) shown in FIG. 5 composes the means for detecting winding voltage as described previously, and compares the (first) winding voltage $V_{NS1}$ (301) in the secondary side of the transformer 120 with the reference voltage Vref1 (303). When the (first) winding voltage $V_{NS1}$ (301) falls down below the reference voltage Vref1 (303), the comparator CMP1 (311) outputs an inverted signal of $V_{NS1}$ at an H (high) level as shown by the top waveform in FIG. 7.

The signal b (324), illustrated by the tenth waveform from the top in FIG. 7, controls to discharge the capacitor Cx (340) by changing its value to an H (high) level and turning ON the N-channel MOSFET MN4 (337). An output of the comparator CMP2 (312) shown in FIG. 5 gives an inverted signal (illustrated by the sixth waveform in FIG. 7) of the winding voltage $V_{NS2}$ that is regulated because a value of the winding voltage $V_{NS2}$ is not necessarily favorable for operation of the synchronous rectification control circuit 300. This signal is inputted to the delay circuit DLY2 (314) with a resetting function.

When this signal starts to rise up, that is, when the winding voltage $V_{NS2}$ starts to fall down, after passing the time td, the output signal h (illustrated by the waveform at the seventh from the top in FIG. 7) from the delay circuit DLY2 (314) with a resetting function is inputted to the one-shot circuit OS2 (316). An output signal k (illustrated by the waveform at the eighth from the top in FIG. 7) from the one-shot circuit OS2 (316) is inputted to the set input terminal S of the RS flip flop FF2 (322) and the signal b (324) at an H (high) level is outputted from the output terminal Q of the RS flip flop FF2 (322). This signal b (324) at an H (high) level is inputted to the gate of the N-channel MOSFET MN4 (337) illustrated in the middle of FIG. 5 and utilized for controlling to turn ON the N-channel MOSFET MN4 (337) and discharge the capacitor Cx (340). The comparator CMP2 (312) shown in FIG. 5 composes the means for detecting winding voltage as described previously, and compares the (second) winding voltage $V_{NS2}$ (302) in the secondary side of the transformer 120 with the reference voltage Vref2 (304). When the (second) winding voltage $V_{NS2}$ (302) in the secondary side of the transformer 120 becomes less than the reference voltage Vref2 (304), the comparator CMP2 (312) outputs an inverted signal of $V_{NS2}$ at an H (high) level as shown in the sixth waveform in FIG. 7. Since the output f from the one-shot circuit OS1 (315) (illustrated by the waveform at the third from the top in FIG. 7) is inputted to the reset input terminal R of the flip flop FF2 (322), the signal b (324) turns to L (low) when the signal f turns to H (high) as illustrated by the waveforms in FIG. 7.

Since the signal h is inputted to the reset input terminal R of the RS flip flop FF1 (321) through the inverter INV1 (318), the RS flip flop FF1 (321) is reset turning the signal a (323) to H (high) when the signal h turns to L (low). The signal h turns to L (low) when the comparator CMP2 (312), which is a means for detecting winding voltage, detects a start of rising up of the winding voltage $V_{NS2}$. Thus, the P-channel MOSFET MP3 (335) is turned OFF to halt charging of the capacitor Cx (340).

The signal c (325), illustrated by the fifth waveform from the top in FIG. 7, turns its value to H (high) to set the RS flip flop FF3 (350) as described in detail in the following. The signal e, illustrated by the second waveform from the top in FIG. 7, is inputted to the delay circuit TIMER (319) as shown in FIG. 5. After a time duration t3, the output g from the delay circuit TIMER (319), illustrated by the fourth waveform from the top in FIG. 7, is inputted to the input terminal of the one-shot circuit OS3 (317). The output signal c (325) from the one-shot circuit OS3 (317) is inputted to the set input terminal S of the flip flop FF3 (350) illustrated in the bottom of FIG. 5. The one-shot circuit OS3 (317) outputs a pulse at an H (high) level as a signal c, when the output g of the delay circuit TIMER (319) starts to rise up to set the RS flip flop FF3 (350).

The signal d (343), though not illustrated in FIG. 7, turns its value to H (high) to reset the RS flip flop FF3 (350) as described in detail in the following. The capacitor Cx (340) is charged at a constant current in the period when the both signal a (323) and signal b (324) are at a low level; the capacitor Cx (340) stops to be charged at the moment the signal a (323) turns to a high level and is held at a voltage at the moment of stop; and the capacitor Cx (340) is discharged at a constant current according to the change of the signal b (324) to a high level. In the process of discharging the capacitor Cx (340) at a constant current, the voltage VCx (338) is compared with a reference voltage Vref3 (339) by the comparator CMP3 (341). When the voltage VCx (338) decreases to the reference voltage Vref3 (339), the one-shot circuit OS4 (342) commences an action outputting the signal d (343). The signal d (343) is inputted to the reset input terminal R of the flip flop FF3 (350) shown at the bottom in FIG. 5 to turn the signal $GN_S1$ outputted from the flip flop FF3 (350) from a high level to a low level.

By this process, the optimum OFF timing can be determined for terminating the synchronous rectification period as illustrated in FIG. 2 and FIG. 3. As shown in FIG. 2, the capacitor Cx (340) is charged in the period t1 and discharged in the period t2. If a current for charging and a current for discharging the capacitor Cx (340) are made equal, the time t2 for discharging the capacitor Cs (340) is estimated to be equal to the changing time t1. Further, by setting the discharging current different from the charging current or by setting the reference voltage Vref3 (339) at an appropriate value, the synchronous rectification transistor MOSFET 203 can be turned OFF before the period t2 terminates, and a reversed current begins to flow in the synchronous rectification transistor MOSFET 203 on start of rising up of the winding voltage $V_{NS1}$, here, the reversed current being a current flowing in the reversed direction with respect to the forward direction of the body diode 205.

FIG. 6A shows a construction of the delay circuits DLY1 (313) and DLY2 (314) used in the circuit of FIG. 5; and FIG. 6B shows a timing chart in the delay circuits. In FIG. 6A, R1 (361) is a resistor; INV2 (362), an inverter; MN5 (363), an N-channel MOSFET; C1 (370), a capacitor; CMP4 (366), a comparator; and Vref4 (365) is a reference voltage or a reference voltage power supply for generating the reference voltage. This circuit of FIG. 6A, as shown in FIG. 6B, performs a delayed action to the beginning of rising up of an input 'in' (360) until the terminal voltage Vc1 (364) of the capacitor C1 (370) exceeds a predetermined reference voltage Vref4 (365) after a time duration td, and does not perform any delayed action to a beginning of falling down of the input 'in' (360).

When the input 'in' (360) is L (low), the N-channel MOSFET MN5 (363) is in the ON state, and the capacitor C1 (370) is discharged to turn the output 'out' (367) to L (low). When the input 'in' (360) turns to H (high), the N-channel MOSFET MN5 (363) turns OFF and the time constant circuit having the resistor R1 and the capacitor C1 begins an action increasing the terminal voltage Vc1 (364) of the capacitor C1 (370) until the Vc1 (364) reaches the reference voltage Vref4 (365) at which the output 'out' (367) turns to H (high). If the input 'in' (360) is oscillating and, turns to L (low) in a short time after beginning of H (high) state, the time constant circuit comprising of the resistor R1 (361) and the capacitor C1 (370) is reset. The time constant circuit starts to act anew at the moment the input 'in' (360) turns to H (high), and performs the delay operation to the beginning of rising up of the input 'in' (360) by a time duration td until the terminal voltage Vc1 (364) of the capacitor C1 (370) exceeds the reference voltage Vref4 (365), turning the output 'out' (367) to H (high). The delay circuit is constructed so as not to perform delay action at beginning of falling down of the input 'in' (360). The circuit of FIG. 6A is a specific example for producing a specified time of delay in an analogue scheme.

A circuit for producing a specified time of delay can be constructed in a digital scheme in place of the analogue scheme of FIG. 6A. Such a digital delay device can be constructed using, for example, a shift resistor (no drawing) with a reset function, or a counter (no drawing) with a reset function that reverses the output from L (low) to H (high) or H (high) to L (low) subsequent to counting a predetermined number of input pulses.

The delay circuit TIMER (319) in FIG. 5 can be constructed by removing the inverter INV2 (362) and the N-channel MOSFET MN5 (363) from the circuit of FIG. 6A. The one-shot circuits OS1 (315), OS2 (316), and OS3 (317) in FIG. 5 are triggered by a rise of an input and output a short pulse at H (high), and commonly used ones, and thus, the illustration and description thereon are omitted.

In an operation corresponding to FIG. 3, the delay circuit TIMER (319) can be removed from the circuit of FIG. 5. In an operation corresponding to FIG. 2, the delay circuits DLY1 (313) and DLY2 (314) are eliminated in the circuit of FIG. 5.

An operation equivalent to the charging and discharging operation for the capacitor Cx (340) by the circuit shown in FIG. 5 can be carried out using a counter in the following manner. The operation of charging the capacitor Cx (340) can be replaced by an operation of counting up of a count clock with a predetermined frequency by a counter; the operation of holding the charged voltage on the capacitor Cx (340) can be replaced by the stop of the counting action and holding of the counted value; and the operation of discharging the capacitor Cx (340) can be replaced by an operation of counting down of the count clock by the counter. The timing of termination of the period t2 can be determined by a counted value in the course of counting down that has arrived at zero count value or the count value corresponding to the threshold voltage Vthoff.

The description in the specification so far has been made on embodiments for the phase shift full bridge converters. The present invention, however, can be applied to any insulated type switching power supplies in which the secondary windings are divided into two sections that are controlled to generate outputs equivalent to each other; the equivalent here means that the two sections are operated in similar voltage waveforms and current waveforms with a phase difference of 180 degrees. A control scheme for the primary side may not be limited to any specific one. Thus, the invention is applicable to current resonance type converters, for example.

The present invention can be applied to insulated type switching power supplies of current resonance type converters having two sections in the secondary side as well as phase shift full bridge converters employing a phase shift scheme in the primary side.

While the invention has been explained with reference to specific embodiments of the invention, the explanation is illustrative and the invention is limited by the appended claims.

What is claimed is:

1. A synchronous rectification control device, comprising:
    means for detecting winding voltages that detects an edge of a first winding voltage of a first section of windings in a secondary side of a transformer and an edge of a second winding voltage of a second section of windings in the secondary side of the transformer;
    means for measuring a period between the edges detected by the means for detecting winding voltage;
    means for estimating an OFF timing for a synchronous rectification switch based on the period obtained by the means for measuring the period,
    means for switch ON control for starting a charging of a capacitor at a constant current when the means for detecting the winding voltages detects the edge of falling down of the first winding voltage and for turning the synchronous rectification switch to an ON state after a predetermined delay time from the start of charging;
    means for holding a voltage of the capacitor when the means for detecting the winding voltages detects an edge of rising up of the second winding voltage; and
    means for switch OFF control for starting a discharging of the capacitor at a constant current when the means for detecting the winding voltage detects an edge of falling down of the second winding voltage and for turning the synchronous rectification switch to an OFF state when the voltage of the capacitor falls down to a threshold voltage that determines an OFF timing.

2. A synchronous rectification control device according to claim 1, wherein the means for measuring the period measures a time t from an edge of falling down of the first winding voltage to an edge of rising up of the second winding voltage, and
    the means for estimating the OFF timing estimates the OFF timing as a first moment at which the time t is elapsed from detection of an edge of falling down of the second winding voltage or a second moment preceding the first moment by a predetermined time.

3. A synchronous rectification control device according to claim 1, further comprising:
    first timing setting means for starting a charging of a capacitor at a constant current when the means for detecting the winding voltages detects the edge of falling down of the first winding voltage;
    second timing setting means for stopping a charging of the capacitor when the means for detecting the winding voltages detects the edge of rising up of the second winding voltage; and
    third timing setting means for starting a discharging of the capacitor at a constant current when the means for detecting the winding voltages detects an edge of falling down of the second winding voltage.

4. A synchronous rectification control device according to claim 1, wherein the means for switch OFF control sets an arbitrary value for the threshold voltage that determines the OFF timing earlier than a preliminarily estimated OFF timing, in consideration of a control delay and a time required for switching the switch.

5. A synchronous rectification control device according to claim 1, further comprising:
    means for setting a predetermined delay period from the edge of falling down of the first winding voltage or the edge of falling down of the second winding voltage in which the both edges are detected by the means for detecting winding voltage, and
    means for resetting the delay period when an edge of falling down or an edge of rising up is detected within a setting of the delay period.

6. The synchronous rectification control device according to claim 5, wherein the means for setting the delay period is composed of a time constant circuits with a resetting function.

7. A synchronous rectification control device according to claim 5, wherein the means for setting the delay period is composed of shift resistors with a resetting function or of a counter with a resetting function, the counter reversing an output when a predetermined number of input pulses are counted.

8. A synchronous rectification control method comprising:
    a step of detecting winding voltages including a process that detects an edge of a first winding voltage of a first section of windings in a secondary side of a transformer and a process that detects an edge of a second winding voltage of a second section of windings, in the secondary side of the transformer;
    a step of measuring a period between the edges detected in the step of detecting the winding voltages;
    a step of estimating an OFF timing for a synchronous rectification switch based on the period obtained in the step of measuring the period,
    a step of starting a charging of a capacitor at a constant current when the edge of falling down of the first winding voltage is detected;
    a step of turning the synchronous rectification switch to an ON state after an arbitrary delay time from the start of charging;
    a step of holding a voltage of the capacitor when the edge of rising up of the second winding voltage is detected; and
    a step of starting a discharging of the capacitor at a constant current when the edge of falling down of the second winding voltage is detected and turning the synchronous rectification switch to an OFF state when the voltage of the capacitor falls down to a threshold voltage that determines an OFF timing.

9. An insulated type switching power supply in which a primary side and a secondary side are insulated by a transformer, the switching power supply having a synchronous rectification control device and comprising:
    means for detecting winding voltages that detects an edge of a first winding voltage of a first section of windings in a secondary side of the transformer and an edge of a second winding voltage of a second section of windings in the secondary side of the transformer;
    means for measuring a period between the edges detected by the means for detecting the winding voltages; and
    means for estimating an OFF timing for a synchronous rectification switch based on the period obtained by the means for measuring the period,
    means for switch ON control for starting a charging of a capacitor at a constant current when the means for detecting the winding voltages detects the edge of falling down of the first winding voltage and for turning the synchronous rectification switch to an ON state after a predetermined delay time from the start of charging;

means for holding a voltage of the capacitor when the means for detecting the winding voltages detects an edge of rising up of the second winding voltage; and means for switch OFF control for starting a discharging of the capacitor at a constant current when the means for detecting the winding voltage detects an edge of falling down of the second winding voltage and for turning the synchronous rectification switch to an OFF state when the voltage of the capacitor falls down to a threshold voltage that determines an OFF timing.

10. The insulated type switching power supply according to claim 9, wherein the means for measuring the period measures a time t from an edge of falling down of the first winding voltage to an edge of rising up of the second winding voltage, and the means for estimating the OFF timing estimates the OFF timing as a first moment at which the time t is elapsed from detection of an edge of falling down of the second winding voltage or a second moment preceding the first moment by a predetermined time.

11. The insulated type switching power supply according to claim 9, wherein the insulated type switching power supply is a phase shift full bridge converter that employs a phase shift scheme in the primary side.

12. The insulated type switching power supply according to claim 9, wherein the insulated type switching power supply is a current resonance type converter with a center tap structure in the secondary side.

* * * * *